Aug. 17, 1965  E. K. HANSEN  3,200,907
POSITIVE PARKING BRAKE
Filed Sept. 25, 1963  2 Sheets-Sheet 1
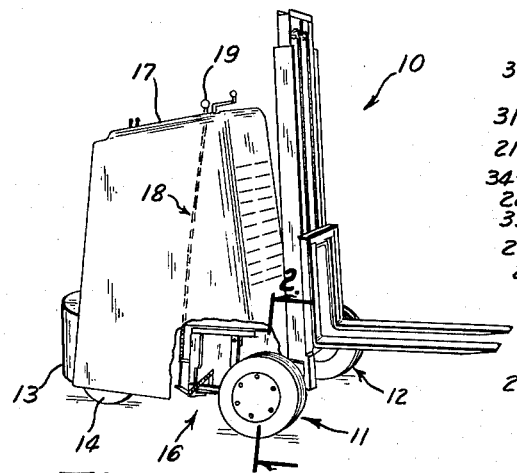
Fig. 1
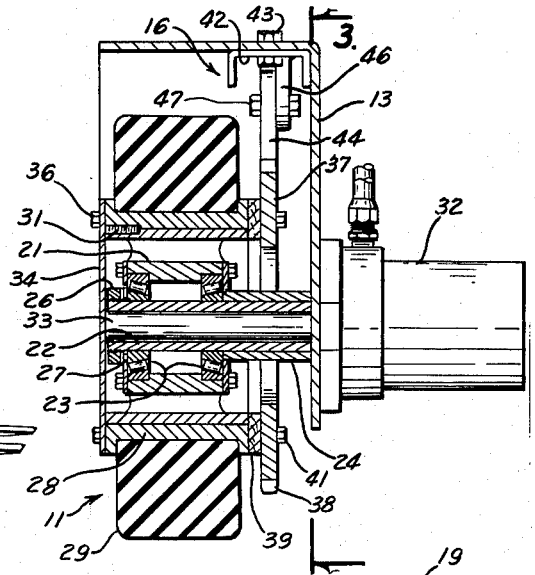
Fig. 2
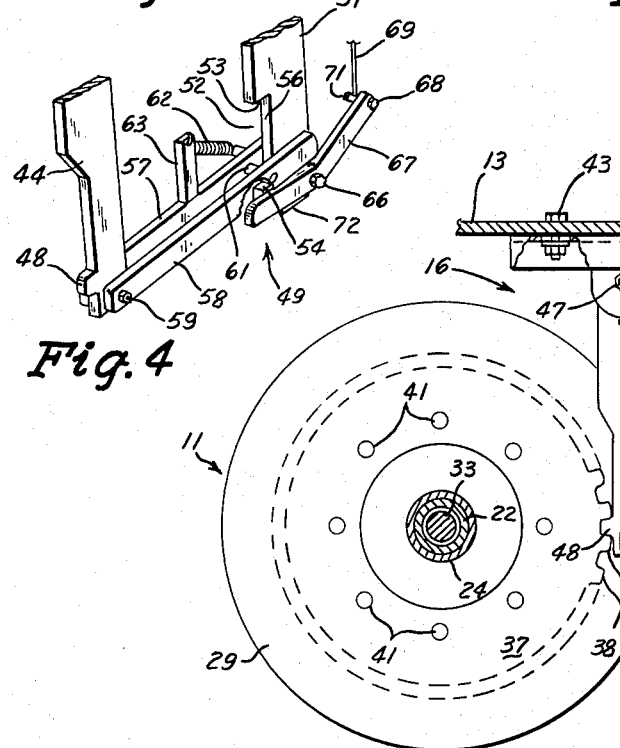
Fig. 4
Fig. 3
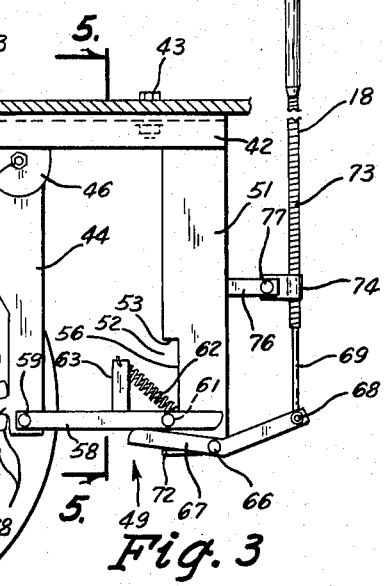
INVENTOR
ELMER K. HANSEN
BY Rudolph L. Lowell
ATTORNEY Aug. 17, 1965    E. K. HANSEN    3,200,907
POSITIVE PARKING BRAKE
Filed Sept. 25, 1963    2 Sheets-Sheet 2

INVENTOR
ELMER K. HANSEN
BY
ATTORNEY

United States Patent Office 3,200,907
Patented Aug. 17, 1965

3,200,907
POSITIVE PARKING BRAKE
Elmer K. Hansen, 126 Cecilia, Sioux City, Iowa
Filed Sept. 25, 1963, Ser. No. 311,446
1 Claim. (Cl. 188—69)

This invention relates to brake mechanisms and more particularly to a positive parking brake for a motor vehicle.

It is the object of the invention to provide an improved parking brake for locking a wheel of a fork lift vehicle.

Another object of the invention is to provide in a brake for a rotatable member, a locking pawl which is biased to a positive lock position with the rotatable member and biased to a release position out of engagement with said rotatable member.

A further object of the invention is to provide a positive brake for a wheel which must be operator actuated before it is released.

Still another object of the invention is to provide a linkage connectable with a locking pawl of a positive brake which is movable by a Bowden cable operated lever to a first position to hold the pawl in a lock position and biased to a second position to hold the pawl in an unlocked position.

An additional object of the invention is to provide a positive brake for a rotatable member which is constructed from a minimum number of parts, reliable in operation and economical in cost.

These and other objects and advantages of the invention will be apparent from the following description and from the accompanying drawing, in which:

FIG. 1 is a perspective view of a fork lift vehicle having a positive parking brake constructed according to the invention;

FIG. 2 is an enlarged sectional view taken along the line 2—2 of FIG. 1;

FIG. 3 is a sectional view taken along the line 3—3 of FIG. 2, illustrating the brake in the lock position;

FIG. 4 is an enlarged perspective view of the control link of the brake of FIG. 3;

Figure 6:
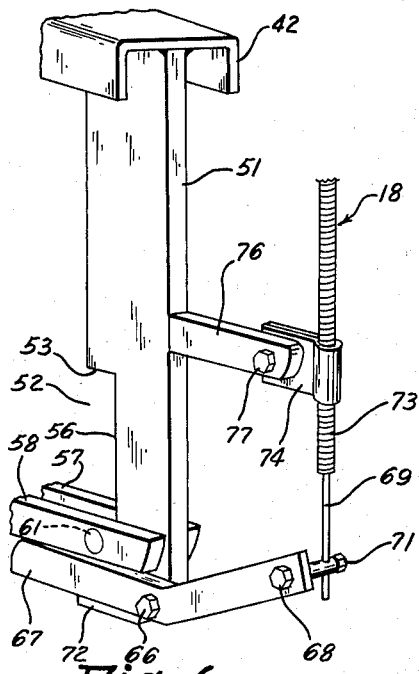
FIG. 6 is a fragmentary perspective view of the connection between the brake lever and Bowden cable.
Figure 5:
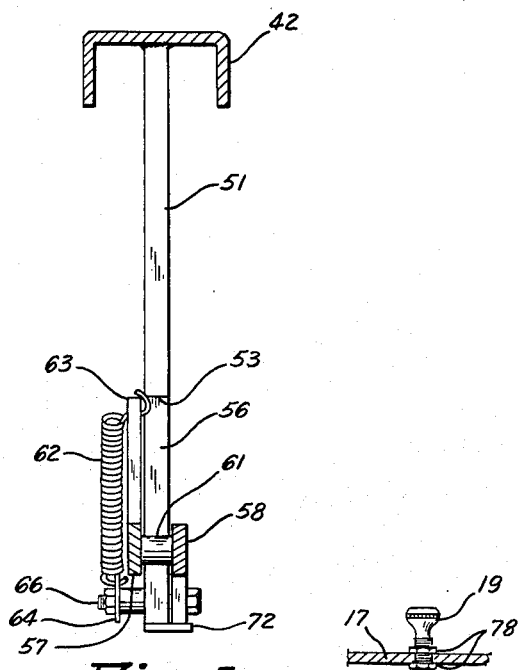
FIG. 5 is a sectional view taken along the line 5—5 of FIG. 3.

Referring to the drawing, there is shown in FIG. 1 a fork lift vehicle 10 equipped with the parking brake of this invention. The vehicle 10 has a motor (not shown) which operates a pump to establish a hydraulic pressure which is used to drive a pair of drive wheels 11 and 12. The motor is carried on a frame 13 which is supported above the ground by the wheels 11 and 12 which are rotatably mounted on opposite sides of the front section of the frame 13. The steering of the vehicle 10 is achieved by a caster wheel 14 which is rotatably mounted on the bottom of the rear section of the frame 13.

The drive wheel 11 is held in a locked position by a parking brake 16 which has a stator unit secured to the frame 13 adjacent the inside of the wheel. The brake 16 is operator controlled from the instrument panel 17 of the vehicle between locked and unlocked positions by the use of a Bowden cable 18. Movement of the Bowden cable 18 is facilitated by a hand-controlled knob 19 connected to the Bowden cable 18 and positioned on the instrument panel 17 so as to be readily accessible to the vehicle operator.

The drive wheel and brake assembly of the vehicle 10 is shown in FIG. 2. The wheel 11 comprises a hub 21 which is journaled on a stub axle 22 by a pair of roller bearings 23. The stub axle 22 is secured to the side of the frame 13 and extends laterally therefrom. A spacer sleeve 24 is positioned about the axle 22 and forms a stop for the inner bearing 23. A nut 26 is threaded on the outer end of the stub axle 22 and engages a lock washer 27. The nut 26 functions to hold the hub 21 in assembled relation with the stub axle 22. An annular rim 28, having a hard rubber tire 29 mounted thereon, is positioned about the hub 21. A key 31 positioned in suitable grooves in the mating surfaces of the periphery of the hub 21 and the annular rim 28 provides a drive connection between the hub and the rim.

The rim 28 is connected in a driving relation to a hydraulic traction motor 32 mounted on the frame 13 in alignment with the stub axle 22. The motor 32 has a drive shaft 33 positioned concentrically within the stub axle 22 and extended the entire length thereof. Secured to the outer end of the drive shaft 33 is a circular disc 34 which has a diameter substantially equal to the diameter of the rim 28. A plurality of circumferentially spaced bolts 36 fasten the disc 34 to the hub 21.

The rotor of the brake 16 is positioned adjacent the inside of the hub 21 and comprises an annular disc 37 having a plurality of gear teeth 38 on its outer peripheral edge. A plurality of circumferentially spaced bolts 41 fasten the annular disc 37 to the inner shoulder 39 of hub 21.

The stator unit of the brake 16 has a channel-shaped beam 42 secured to the frame 13 by bolts 43. The channel beam 42 is open in a downward direction and is positioned over a portion of the annular disc 37 so as to extend in a rearward direction in the plane of the disc 37. Positioned adjacent the back side of the disc 37 is a pawl element 44 which projects in an upward direction. The top section of the pawl element 44 engages the side of a leg 46 which is secured to the base of the channel beam 42 and projects in a downward direction. A pivot bolt 47 rotatably mounts the pawl element on the leg 46 for movement about an axis which is substantially parallel to the axis of rotation of the wheel 11. The lower end section of the pawl element 44 has a forwardly extended tooth 48 which interengages with the teeth 38 of the annular disc 37. As shown in FIG. 3, the tooth 48 is positioned in a horizontal plane which extends through the axis of rotation of the wheel 11. The side angles of the respective teeth are selected to effect a free and easy separation of the pawl element when under load.

Figure 7:
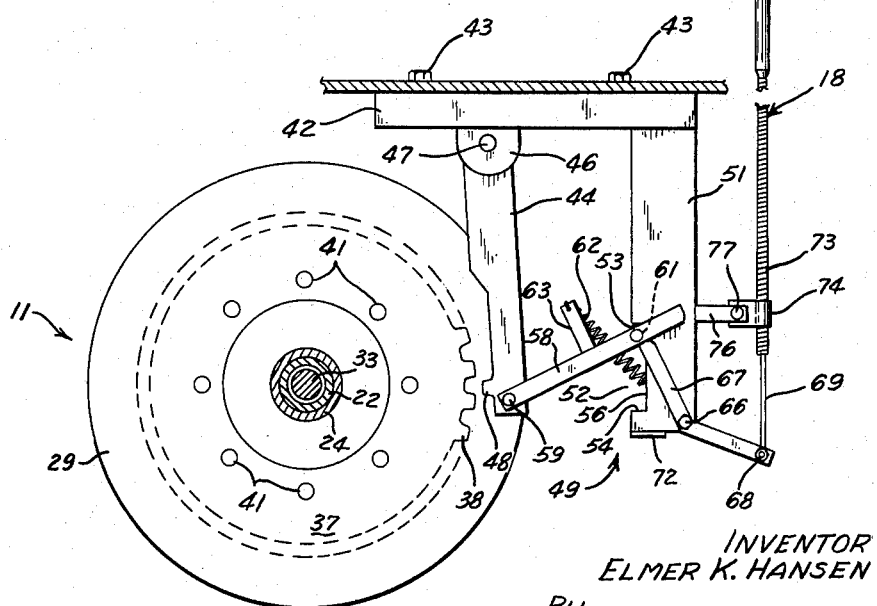
FIG. 7 is a view similar to FIG. 3 illustrating the brake in the unlocked position.

The pawl element 44 angularly moves about the pivot bolt 47 from a locked position, as shown in FIG. 3, to an unlocked position, as shown in FIG. 7. These positions are determined by an actuating linkage indicated generally by the numeral 49. The linkage 49 includes a downwardly extended arm 51 positioned in the plane of the disc 37 and secured at its upper end to the web of the channel beam 42. The edge of the arm 51 facing the pawl element 42 has a recess 52 which defines an upper stop abutment 53, a lower stop abutment 54, and a linear cam surface 56 positioned between the stop abutments 53 and 54. The recess 52 is adjacent the lower end of the arm 51 facing the lower end of the pawl element 44.

As shown in FIG. 4, a link comprising a pair of parallel members 57 and 58 positioned in a side-by-side relation, extends between the pawl element 44 and the arm 51. The forward end of the member 57 and 58 are pivotally connected by a bolt 59 to the lower end of the pawl element 44. The opposite ends of the members 57 and 58 are positioned on the opposite sides of the arm 51 rearwardly of the recess 52 and are secured together in a spaced relationship by a circular spacer rod 61. The rear end sections of the link members 57 and 58, which straddle the arm 51, guide the spacer rod 61 along the cam surface 56 between the stop abutments 53 and 54.

The link members 57 and 58 have an effective length such that when the spacer rod 61 is in engagement with the lower stop abutment 54, as shown in FIG. 3, the pawl element 44 is in the locked position with the teeth 38 and 48 in an interengaged position. The linear cam surface 56 extends in a plane which is normal to the plane formed by the horizontal diameter of the wheel 11. With this relationship the distance between the stop abutment 53 and the axis of rotation of the wheel is greater than the distance between the stop abutment 54 and the axis of rotation of the wheel 11. Thus, when the spacer rod 61 is moved into engagement with the upper abutment 53 the link members 57 and 58 angularly move the pawl element 44 to the unlocked position as shown in FIG. 7.

A coiled spring 62 has one end connected to an upright leg 63, that is secured to the mid-section of the link member 57, and has its opposite end connected to a washer 64 carried by a bolt 66 positioned in the lower end of the arm 51. The spring 62 biases the spacer rod 61 in a rearward and downward direction thereby holding the rod 61 in engagement with the linear cam surface 56 and the stop abutment 54. Thus, the tension spring 62 biases the pawl element 44 into locked and unlocked positions depending upon the location of the spacer rod 61.

The angular position of the link members 57 and 58 is controlled by a crank lever 67 which is pivotally secured at its mid-section by the bolt 66 to the lower end of the arm 51. The forward end of the lever 67 is positioned below the link member 58 and is in engagement therewith. The rear end of the lever 67 extends rearwardly of the arm 51 and carries a thimble bolt 68. The wire 69 of the Bowden cable 18 extends through a transverse hole in the bolt 68 and is secured to the bolt 68 by a set screw 71. Secured to the bottom edge of the arm 51 and extended below the forward section of the crank lever 67, is a stop tab 72 which limits the angular movement of the crank lever 67.

As shown in FIG. 6, the sheath 73 of the Bowden cable 18, is held in a clamp 74 secured to a rearward extension 76 of the arm 51. The clamp 74 extends about the lower end of the sheath 73 and is connected to the extension 76 by a bolt 77. As shown in FIG. 3, the upper end of the Bowden cable 18 is mounted on the instrument panel 17 of the vehicle by a pair of nuts 78. The hand-controlled knob 19 is secured to the end of the wire 69 of the Bowden cable 18.

In use, the pawl element is normally biased to the locked position by the tension spring 62 which holds the link levers 57 and 58 in a substantially horizontal position. In this position the link levers and spacer rod 61 form a structural bridge between the arm 51 and the pawl element 44. The parking brake cannot be released until the link members 57 and 58 are angularly moved in an upward direction positioning the rod 61 in engagement with the upper stop abutment 53.

The operator of the vehicle releases the brake 16 by moving the control knob 19 toward the instrument panel 17. This movement forces the wire 69 of the Bowden cable 18 in a downward direction. As shown in FIG. 7, when the wire 69 moves from the sheath 73 of the Bowden cable 18, the lever 67 is rotated about the pivot bolt 66. The forward section of the lever 67 moves in an upward direction pivoting the link members 57 and 58 about the pivot pin 59. This angular motion of the link members moves the rod 61 into engagement with the upper abutment 53 on the arm 51. The biasing force of the tension spring 62 moves the link members 57 and 58 and pawl element 44 in a rearward direction a distance which is sufficient to disengage the tooth 48 of the pawl element 44 from the teeth 38 of the annular disc 37.

After the vehicle has stopped, the operator can set the brake in a locked position by moving the control knob 19 in an outward direction. This movement rotates the crank lever 67 until it engages the stop tab 72. The spring 62 will bias the link members 57 and 58 into a horizontal position, as shown in FIG. 3. The spacer rod 61 rides on the linear cam surface 56 and forces the lower end of the pawl element 44 toward the axis of rotation of the wheel 11, moving the pawl element 44 to its locked position as shown in FIG. 3.

In summary, the parking brake 16 has a parking pawl 44 which is biased by the spring 62 into a positive locked position with a rotatable member 37. The spring 62 also functions to bias the locking pawl to a released position with respect to the rotatable member 37. These opposite functions of the spring 62 are a result of the position of the control link members 57 and 58 and associated rod 61 with respect to the vertically spaced stop abutments 53 and 54 and the linear cam surface 56 between the stop abutments. The position of the link members is operator controlled by the use of a Bowden cable actuated crank lever 67 which moves the control link relative to the stationary arm 51.

While there have been shown, described and pointed out the fundamental novel features of the invention, it is to be understood that various omissions, substitutions, changes in form, and details of the brake apparatus illustrated may be made by those skilled in the art without departing from the spirit of the invention. It is intended to be limited only as indicated by the scope of the following claim.

I claim:

In a brake,
(a) rotor means having teeth means on the outer peripheral section thereof.
(b) a stationary arm positioned in the plane of rotation of said rotor means, said arm having a cam surface facing said rotor means and arranged in a plane normal to a plane extended diametrically of said rotor means, a first stop at one end of said cam surface, and a second stop at the other end of said cam surface, said first and second stops located at opposite sides of said diametrically extended plane,
(c) pivoted locking pawl means pivotally movable in the plane of rotation of said rotor means, and located between said arm means and said rotor means, said pawl means having a portion opposite said cam surface moveable to and from an engaged position with the teeth means of said rotor means.
(d) means pivotally mounting said pawl means for movement about an axis extended parallel to the axis of rotation of said rotor means, said pawl means when engaged with said teeth means being located in a plane substantially parallel to the plane of the cam surface on said stationary arm,
(e) link means pivotally conneced to said pawl means and guidably supported on said arm, said link means having a follower portion engageable with the cam surface of said arm, said follower portion of the link means engageable with the first stop of the arm to hold said pawl means in an engaged position with the teeth means and engageable with the second stop of the arm to hold said pawl means disengaged from said teeth means,
(f) means connected to said arm and link means operative to bias said follower portion into engagement with said cam surface.
(g) lever means pivotally mounted on said arm and engageable with said link means, said lever means movable to a position to move said link means against the action of said biasing means into engagement with the second stop, and (h) Bowden cable means connected to said arm and lever means operative to pivotally move said lever means to said position.

References Cited by the Examiner

UNITED STATES PATENTS

| | | | |
|---|---|---|---|
| 506,504 | 10/93 | Hollis | 188—74 |
| 1,495,819 | 5/24 | Thomas | 188—31 |
| 2,587,746 | 3/52 | May | 74—520 |
| 2,770,326 | 11/56 | Wayman | 188—69 |
| 2,954,103 | 9/60 | Sand | 188—69 |
| 3,117,653 | 1/64 | Altherr | 188—74 |

ARTHUR L. LA POINT, *Primary Examiner.*

EUGENE G. BOTZ, *Examiner.*